United States Patent
Erhart

(10) Patent No.: US 11,084,397 B2
(45) Date of Patent: Aug. 10, 2021

(54) POWER SUPPLY SYSTEM FOR VEHICLE WITH MULTIPLE OPERATING VOLTAGES

(71) Applicant: Samsung SDI Co., Ltd., Yongin-si (KR)

(72) Inventor: Michael Erhart, Seiersberg-Pirka (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 58 days.

(21) Appl. No.: 16/541,037

(22) Filed: Aug. 14, 2019

(65) Prior Publication Data

US 2020/0079232 A1 Mar. 12, 2020

(30) Foreign Application Priority Data

Sep. 7, 2018 (EP) .................................. 18193097
Feb. 20, 2019 (KR) ........................ 10-2019-0020035

(51) Int. Cl.
*B60L 58/20* (2019.01)
*B60L 58/22* (2019.01)
(Continued)

(52) U.S. Cl.
CPC .............. *B60L 58/20* (2019.02); *B60L 58/22* (2019.02); *B60L 50/60* (2019.02); *B60L 58/10* (2019.02);
(Continued)

(58) Field of Classification Search
CPC ......... B60L 58/10–27; B60L 50/60–66; B60R 16/033; H02J 7/1423
See application file for complete search history.

(56) References Cited

U.S. PATENT DOCUMENTS 6,323,608 B1 11/2001 Ozawa
6,982,499 B1 * 1/2006 Kachi ................. B60L 15/2045
307/75

(Continued)

FOREIGN PATENT DOCUMENTS

EP 2587618 A2 5/2013
EP 3293036 A1 3/2018
(Continued)

OTHER PUBLICATIONS

Partial European Search Report for EP18193097.5, dated Mar. 21, 2019, 14 pages.
(Continued)

*Primary Examiner* — Hal Kaplan
*Assistant Examiner* — David A Shiao
(74) *Attorney, Agent, or Firm* — Lewis Roca Rothgerber Christie LLP

(57) ABSTRACT

A power supply system includes: a plurality of battery cells interconnected between a first stack node and a second stack node and providing a first operation voltage to a high-voltage board net; a low-voltage battery interconnected between the second stack node and a low voltage node and outputting a second operation voltage to a low-voltage board net; a step-down converter interconnected between the first stack node and the second stack node and outputting a third operation voltage to the low voltage node to charge the low-voltage battery; an intermediate node dividing the battery cells into first and second subsets of the battery cells and being connected to the low voltage node via a first switching element; and a control unit configured to detect a terminal voltage of the low-voltage battery and to set the first switching element into a conductive state according to the detected terminal voltage.

17 Claims, 6 Drawing Sheets

(51) Int. Cl.
*B60L 50/60* (2019.01)
*H02M 3/158* (2006.01)
*B60L 58/10* (2019.01)

(52) U.S. Cl.
CPC ....... *B60Y 2200/91* (2013.01); *B60Y 2200/92* (2013.01); *B60Y 2400/112* (2013.01); *H02M 3/158* (2013.01)

(56) References Cited

U.S. PATENT DOCUMENTS

| | | | | |
|---|---|---|---|---|
| 2004/0130214 | A1* | 7/2004 | Murty | H02J 7/1423 307/66 |
| 2008/0191663 | A1 | 8/2008 | Fowler et al. | |
| 2013/0106320 | A1* | 5/2013 | Yugo | H02J 1/08 318/139 |
| 2014/0368041 | A1* | 12/2014 | Tu | B60L 7/14 307/52 |
| 2015/0115707 | A1* | 4/2015 | Reichow | B60L 50/60 307/10.1 |
| 2015/0298631 | A1 | 10/2015 | Belger et al. | |
| 2017/0036545 | A1* | 2/2017 | Lopez De Arroyabe | B60L 1/00 |
| 2018/0319287 | A1* | 11/2018 | Forssell | B60L 11/1866 |
| 2018/0323638 | A1* | 11/2018 | Eriksson | B60L 58/20 |
| 2019/0359081 | A1* | 11/2019 | Erhart | H02J 7/0014 |
| 2020/0023794 | A1* | 1/2020 | Maekawa | B60R 16/03 |

FOREIGN PATENT DOCUMENTS

| | | |
|---|---|---|
| EP | 3360719 A1 | 8/2018 |
| JP | 5865013 B2 | 2/2016 |
| KR | 10-1836643 B1 | 3/2018 |

OTHER PUBLICATIONS

Extended European Search Report for EP18193097.5, dated Jun. 14, 2019, 14 pages.

European Office action issued in corresponding application No. EP18 193 097.5, dated Jun. 23, 2021, 5 pages.

* cited by examiner

POWER SUPPLY SYSTEM FOR VEHICLE WITH MULTIPLE OPERATING VOLTAGES

CROSS-REFERENCE TO RELATED APPLICATIONS

This application claims priority to and the benefit of European Patent Application No. 18193097.5, filed in the European Patent Office on Sep. 7, 2018, and Korean Patent Application No. 10-2019-0020035, filed in the Korean Intellectual Property Office on Feb. 20, 2019, the entire content of both of which are incorporated herein by reference.

BACKGROUND

1. Field

Aspects of embodiments of the present invention relate to a power supply system.

2. Related Art

A rechargeable (or secondary) battery differs from a primary battery in that it is designed to be repeatedly charged and discharged, while the latter is designed to provide an irreversible conversion of chemical to electrical energy. Low-capacity rechargeable batteries may be used as power supplies for small electronic devices, such as cellular phones, notebook computers, and camcorders, while high-capacity rechargeable batteries may be used as power supplies for hybrid vehicles and the like.

Generally, rechargeable batteries include an electrode assembly including a positive electrode, a negative electrode, and a separator interposed between the positive and negative electrodes, a case receiving (or accommodating) the electrode assembly, and an electrode terminal electrically connected to the electrode assembly. An electrolyte solution is injected into the case to enable charging and discharging of the battery via an electrochemical reaction between the positive electrode, the negative electrode, and the electrolyte solution. The shape of the case, such as cylindrical or rectangular, may be selected based on the battery's intended purpose.

Rechargeable batteries may be used as a battery module, which includes a plurality of unit battery cells coupled to each other in series and/or in parallel to provide relatively high energy density for, as an example, driving a motor of a hybrid vehicle. For example, the battery module may be formed by interconnecting the electrode terminals of the plurality of unit battery cells, the number of unit battery cells determined depending on a desired amount of power, to provide a high-power rechargeable battery for, as an example, an electric vehicle. One or more battery modules may be mechanically and electrically integrated, equipped with a thermal management system, and configured to communicate with one or more electrical consumers in order to form a battery system.

Static control of battery power output and charging may not be sufficient to meet the dynamic power demands of various electrical consumers connected to the battery system. Thus, steady or intermittent exchange of information between the battery system and the controllers of the electrical consumers may be employed. This information may include the battery system's actual state of charge (SoC), potential electrical performance, charging ability, and internal resistance as well as actual or predicted power demands or surpluses of the consumers.

For monitoring, controlling, and/or setting the aforementioned parameters, a battery system may include a battery management unit (BMU) and/or a battery management system (BMS). Such control units (or controllers) may be an integral part of the battery system and disposed within a common housing or may be part of a remote control unit that communicates with the battery system via a suitable communication bus. In both cases, the control unit communicates with the electrical consumers via a suitable communication bus, such as a CAN or SPI interface.

The electric motor of an electric vehicle may be powered by a high voltage battery system, such as a 48 V battery system. The 48 V battery system may be connected to a 48 V board net (e.g., a high-voltage board net or a 48 V circuit), and the 48 V board net may include electronic control units (ECUs) powered by the 48 V battery system. The 48 V battery system is usually charged by an electric generator (e.g., a combined starter generator), which is therefore also a part of the 48 V board net. The electric vehicle may further include a 12 V board net (e.g., a 12 V circuit) that may be related to (e.g., that may include or power) security relevant functions. For example, an ECU of a power steering system or an ECU of an antiskid system (e.g., ABS) may be integrated in the 12 V board net. The 12 V board net may include a 12 V battery system, for example, a lead-acid based 12 V battery, that may be charged by the 48 V board net via a DC/DC converter.

In order to guarantee the security relevant functions supplied by the 12 V board net, the DC/DC converter interconnected between the 48 V battery and the 12 V battery may provide an operating voltage to the 12 V board net in case of failure of the 12 V battery. However, when the DC/DC converter is configured to act as a redundant power supply, it should be designed in view of high functional safety standards, such as ISO26262. In order to meet these safety standards, the complexity and, thus, the cost of the DC/DC converter may increase drastically.

BRIEF SUMMARY

According to embodiments of the present invention, an alternative power supply system for supplying different operating voltages, for example, for supplying two different board nets of an electric vehicle, is provided. The production costs, weight, and installation space requirements of the power supply system are reduced compared to the prior art. Further, security relevant functions related to at least one of the board nets of the electric vehicle is powered in a redundant manner.

One or more of the drawbacks of the prior art may be avoided or at least mitigated according to embodiments of the present invention. In one embodiment, a power supply system for an electric vehicle is provided that includes a plurality of stacked (e.g., interconnected) battery cells that are interconnected between a first stack node and a second stack node and that are configured to provide a first operation voltage for supplying a high-voltage board net of the electric vehicle. For example, the high-voltage board net spans between the first and the second stack nodes. The plurality of stacked battery cells may include battery cells connected to each other in parallel between a first terminal and a second terminal. In one embodiment, a plurality of submodules, each including a plurality of cells connected to each other in parallel, may be connected to each other in series between the first and second stack nodes. Thus, the added voltage of all of the battery cells connected to each other in series between the first and second stack nodes applies between the first stack node and the second stack node. For example, a voltage between 36 V and 52 V, such as 48 V, is applied between the first stack node and the second stack node of the power supply system.

The power supply system may further include a low-voltage battery that is interconnected between the second stack node and a low voltage node and that is configured to output a second operation voltage for supplying a low-voltage board net of the electric vehicle. The low-voltage battery may be a nickel cadmium battery and/or may supply a 12 V board net of the electric vehicle. Hence, the low-voltage battery may supply an operation voltage of 12 V. In the power supply system according to an embodiment of the present invention, the low-voltage board net spans between the second stack node and the low voltage node. However, in some embodiments, the low-voltage board net may span between the first stack node and the low voltage node. In some embodiments, the second stack node is connected to ground, for example, is the low voltage node of the stacked battery cells.

In a power supply system according to an embodiment of the present invention, a step-down converter is further interconnected between the first stack node and the second stack node and that is configured to output a third operation voltage to the low voltage node for charging the low-voltage battery. For example, the step-down converter receives the voltage output by the plurality of stacked battery cells and outputs a reduced voltage thereof to the low voltage node. Hence, the low-voltage board net can be additionally (or alternatively) supplied by operation of the step-down converter (e.g., the DC/DC converter).

The DC/DC converter may be a buck converter, a forward converter, and/or a flyback converter. In one embodiment, the converter is a full bridge converter, a buck-boost converter, and/or a push-pull converter. The DC/DC converter may be configured to convert the first voltage (e.g., an input voltage) to the third voltage (e.g., an output voltage).

The power supply system according to an embodiment of the present invention may further include an intermediate node dividing the plurality of stacked battery cells into a first subset of the battery cells (e.g., a first sub-stack) and a second subset of the battery cells (e.g., a second sub-stack). For example, the added voltage of all of the battery cells connected to each other in series between the first stack node and the intermediate node is applied between the first stack node and the intermediate node, and the added voltage of all of the battery cells connected to each other in series between the intermediate node and the second stack node is applied between the intermediate node and the second stack node. The first subset and the second subset of the battery cells may include the same number or different numbers of battery cells connected to each other in series between the respective nodes. Further, the nominal output voltages of the first and second subsets of the battery cells may be the same or different. Further, the battery cells of the first sub-stack may have a different capacity than the battery cells of the second sub-stack. According to an embodiment of the present invention, the intermediate node is connected to the low voltage node via a first switching element, and a conductive path between the intermediate node and the low voltage node is either opened or closed (e.g., may be controlled to be either open or closed).

The power supply system according to an embodiment of the present invention may further include a control unit that is configured to detect a terminal voltage of the low-voltage battery and to set the first switching element into a conductive state depending on (e.g., according to) the detected terminal voltage. In one embodiment, the control unit may be configured to set the first switching element into either a conductive or non-conductive state based on the terminal voltage of the low-voltage battery. The control unit may be integrated into the battery system of the stacked battery cells or may be part of an electric vehicle including the power supply system. The control unit may also be an individual component of the power supply system.

The power supply system according to an embodiment of the present invention may supply a high-voltage board net and a low-voltage board net of an electric vehicle. By supplying the low-voltage board net via a high voltage battery stack and a step-down converter, via a low-voltage battery, and/or via the second sub-stack of the high voltage battery stack, improved redundancy in supplying the security relevant low-voltage board net is provided. Further, controlling the conductivity of the first switching element based on the terminal voltage of the low-voltage battery allows the voltage provided between the intermediate node and the second stack node and to the low-voltage board net via the low voltage node to be freely set. Hence, an electric vehicle including the power supply system according to embodiments of the present invention may be brought into a safe state in response to a malfunction or degradation of the low-voltage battery without an interruption of the safety relevant 12 V board net and can thus "limp home". Further, in the power supply system according to embodiments of the present invention, the step-down converter is no longer a safety critical component and additional measures and costs do not have to be considered for the step-down converter. Further, additional costs may be avoided with respect to the high voltage battery stack, which can be, for example, a generic 48 V battery system without further modification for 12 V safety supply.

In one embodiment of the power supply system, the third operation voltage is less than or equal to the second operation voltage. For example, the voltage supplied by the step-down converter to the low-voltage board net is less than or equal to the voltage supplied by the low-voltage battery. Further, a fourth operation voltage provided by the second subset of the battery cells has a level between the second operation voltage and the third operation voltage. For example, the fourth operation voltage may exceed the third operation voltage without exceeding the second operation voltage. In one embodiment, the second, third, and fourth operation voltages are the same or are substantially the same. Hence, the performance of the low-voltage board net is ensured.

The control unit may be configured to set the first switching element into a conductive state when the detected terminal voltage is less than a first voltage threshold. The first voltage threshold may be less than or equal to the second operation voltage. For example, the first voltage threshold may be between 50% and 100% of the second operation voltage, between 60% and 95%, 70% and 90%, or 80% and 85% of the second operation voltage. Thus, a malfunction or degradation of the low-voltage battery is safely recognized and can be distinguished from mere voltage fluctuations. Further, the control unit may be configured to set the first switching element into a non-conductive state when the detected terminal voltage is greater than a second voltage threshold. The second voltage threshold may be greater the first voltage threshold. Thus, normal operation of the power supply system is resumed when the low-voltage battery is sufficiently charged. During normal operation of the power supply system, the low-voltage board net is supplied by either the low-voltage battery or the step-down converter.

According to another embodiment, the first voltage threshold may be less than at least one of the second to fourth operation voltages. In one embodiment, the first voltage threshold is less than each of the second to fourth operation voltages. In such an embodiment, at least some of and up to all of the operation voltages are not limited by the first voltage threshold because the first switching element is controlled solely according to the terminal voltage of the low-voltage battery cell and not the voltage of the low- or high-voltage board net.

In another embodiment of the power supply system, the step-down converter includes a first input node that is connected to the first stack node and a second input node that is connected to the second stack node. Thus, the first input node is at the same electric potential as the first stack node, and the second input node is at the same electric potential as the second stack node. A second switching element and an energy storage element are connected in series between the first input node and the low voltage node. In one embodiment, the second switching element is interconnected between the first input node and the energy storage element. Further, a third switching element is interconnected between the second input node and a first converter node, and the first converter node is electrically connected between the second switching element and the energy storage element. In one embodiment, the step-down converter is a buck converter, and an energy storage element is an inductor. However, the energy storage element may be a capacitor, and hence, a charge pump may be used as the step-down converter. However, less power loss may occur when the energy storage element is the inductor.

The step-down converter may include a rectifying element interconnected between the energy storage element and the low voltage node, and the rectifying element may be configured to suppress current from the low voltage node to the step-down converter. The rectifying element suppresses cross-talk from the low-voltage board net to the high-voltage board net. In one embodiment, the rectifying element is a diode, and by using a passive element, such as a diode, switching noise is reduced.

According to another embodiment, the step-down converter is further configured to output the third operation voltage to the intermediate node to transfer energy from the first subset of the battery cells to the second subset of the battery cells. This configuration allows for the balancing of the first subset and the second subset of the battery cells. Therein, a voltage exceeding the voltage applied to the intermediate node is applied to the step-down converter's output. Thus, a current flows into the intermediate node, and thus, the first subset of the battery cells is less discharged or may be charged. Hence, even though the control unit is exclusively supplied by the first subset of the battery cells when the first switching element is set into the conductive state, no persistent misbalance between the first and second subsets of battery cells results.

To provide energy transfer from the first sub-stack to the second sub-stack, the step-down converter may include a second converter node that is electrically connected between the low voltage node and the energy storage element and a fourth switching element that is electrically connected between the second converter node and the intermediate node. Hence, by setting the fourth switching element into a conductive state, the second converter node is electrically connected to the intermediate node. Further, the step-down converter may include a fifth switching element that is electrically connected between the second converter node and the low voltage node. Thus, the low-voltage board net may be disconnected from the step-down converter when the converter is used for stack balancing. In such an embodiment, the step-down converter may include a further rectifying element interconnected between the intermediate node and the second converter node configured to suppress a current from the intermediate node to the step-down converter.

According to embodiments, the power supply system may be operated in a first operation mode, in which the high-voltage board net is operated by the stacked battery cells and the low-voltage board net is operated by the low-voltage battery and/or the step-down converter. In the first operation mode, the low-voltage battery may be charged by the step-down converter. Further, the power supply system may be operated in a second operation mode, in which the high-voltage board net is operated by the stacked battery cells and the low-voltage board net is operated by the second sub-stack via the conductive first switching element. Further, the power supply system may be operated in a third operation mode, in which the step-down converter balances the first and second sub-stack and/or charges the low-voltage battery. Therein, the third operation mode may be performed when an electric vehicle including the power supply system is in an idle state. Further, in a fourth operation mode, the low-voltage battery is charged via the step-down converter while the low-voltage board net is operated by the second sub-stack via the conductive first switching element. In this embodiment, the low-voltage battery may be interconnected between the second stack node and the second converter node. Further, the first rectifying element may be interconnected between the low voltage node and the low-voltage battery and configured to suppress a current from the low-voltage board net to the low-voltage battery. According to this embodiment, the low-voltage board net is operable via the second sub-stack when the low-voltage battery is discharged, for example, during winter, and/or while the low-voltage battery is being charged.

To operate the power supply system in one of these operation states, the control unit may be further configured to control the conductivity of at least one and up to all of the second to fifth switching element. To simplify the operation of the switching elements, the second and third switching elements may be a first pair of complementary transistors and/or the fourth and fifth switching elements may be a second pair of complementary transistors. As the conductivity states of the second and third switching element should be complementary, using complementary transistors allows these conductivity states to be set by a single control signal. Similarly, the conductivity states of the fourth and fifth switching element may also be complementary by using complementary transistors such that these conductivity states may be set by a single control signal. Further, the first and second rectifying elements may be switching elements. In one embodiment, the first and second rectifying elements are provided by the fourth and fifth switching elements, respectively. Further, the control unit of the power supply system is configured to set the duty cycle of at least one of the switching elements to balance the sub-stacks.

Another embodiment of the present invention is directed to a vehicle including a power supply system according to one or more of the above-described embodiments of the present invention and further including one or more first loads that are interconnected between the first stack node and the second stack node and one or more second loads that are interconnected between the second stack node and the low voltage node. In another embodiment, the vehicle includes a power supply system according to one or more of the above-described embodiments of the present invention and further includes a starter generator that is interconnected between the first stack node and the second stack node. The first load may have an operation voltage of about 48 V, and the second load may have an operation voltage of about 12 V.

Another embodiment of the present invention relates to a method of operating the power supply system according to one or more of the above-described embodiments of the present invention that is part of a vehicle as described above. According to an embodiment of the present invention, the power supply system is operated in one of a first, second, third, or fourth operation mode. In the first operation mode, the high-voltage board net is operated by the stacked battery cells and the low-voltage board net is operated by the low-voltage battery and/or the step-down converter. In the first operation mode, the low-voltage battery may be charged by the step-down converter. In the second operation mode, the high-voltage board net is operated by the stacked battery cells and the low-voltage board net is operated by the second sub-stack via the conductive first switching element. In the third operation mode, the step-down converter balances the first and second sub-stacks and/or charges the low-voltage battery. The third operation mode may be performed when an electric vehicle including the power supply system is in an idle state. In the fourth operation mode, the low-voltage battery is charged via the step-down converter while the low-voltage board net is operated by the second sub-stack via the conductive first switching element. Thus, the low-voltage board net is powered via the second sub-stack when the low-voltage battery is discharged, for example, during winter, and/or while the low-voltage battery is being charged for later use.

Further aspects and embodiments of the present invention are disclosed in the dependent claims and in the following description of the drawings.

BRIEF DESCRIPTION OF THE DRAWINGS

Aspects and features of the present invention will become apparent to those of ordinary skill in the art by describing, in detail, exemplary embodiments thereof with reference to the attached drawings, in which.

DETAILED DESCRIPTION

Figure 1:
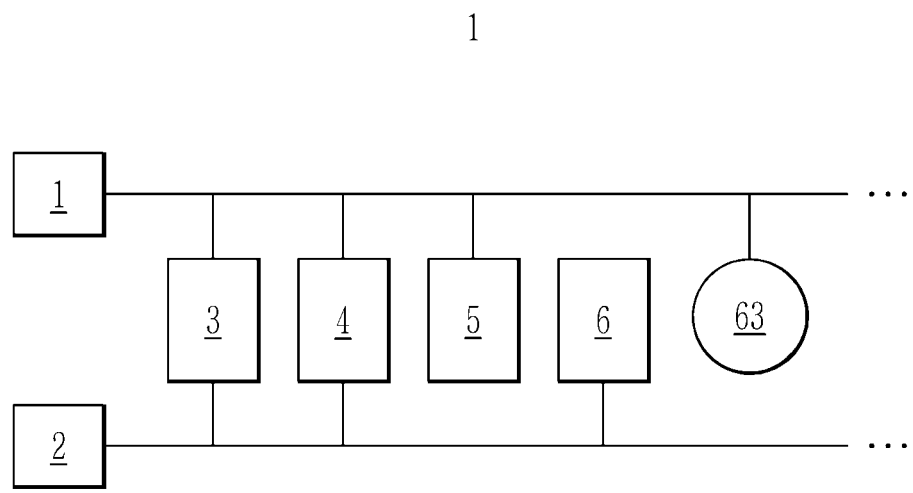
FIG. 1 is a schematic illustration of a dual power supply system of an electric vehicle according to the related art.

Reference will now be made, in detail, to embodiments, examples of which are illustrated in the accompanying drawings. Aspects and features of the exemplary embodiments, and implementation methods thereof, will be described with reference to the accompanying drawings, wherein like reference numerals denote like elements. Redundant descriptions of like elements may be omitted for brevity. The present invention, however, may be embodied in various different forms and should not be construed as being limited to the embodiments illustrated herein. Rather, these embodiments are provided as examples so that this disclosure will be thorough and complete and will fully convey the aspects and features of the present invention to those skilled in the art. Accordingly, processes, elements, and techniques that are not considered necessary to those having ordinary skill in the art for a complete understanding of the present invention may not be described. In the drawings, the relative sizes of elements, layers, and regions may be exaggerated for clarity.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

As used herein, the term "and/or" includes any and all combinations of one or more of the associated listed items. Further, the use of "may" when describing embodiments of the present invention refers to "one or more embodiments of the present invention." In the following description of embodiments of the present invention, the terms of a singular form may include the plural form unless the context clearly indicates otherwise. It will be understood that, although the terms "first," "second," etc. may be used to describe various elements, these elements should not be limited by these terms. These terms are used to distinguish one element from another element. For example, a first element may be named a second element and, similarly, a second element may be named a first element, without departing from the scope of the present invention. Expressions, such as "at least one of," when preceding a list of elements, modify the entire list of elements and do not modify the individual elements thereof.

As used herein, the terms "substantially," "about," and similar terms are used as terms of approximation and not as terms of degree and are intended to account for the inherent deviations in measured or calculated values that would be recognized by those of ordinary skill in the art. Further, if the term "substantially" is used in combination with a feature that could be expressed using a numeric value, the term "substantially" denotes a range of +/−5% of the value centered on the value.

FIG. 1 is a schematic illustration of a power supply system of an electric vehicle according to the related art. The power supply system according to the related art includes a 48 V battery system 1 and an additional 12 V battery system 2 that is external to the 48 V battery system 1. The 48 V battery system 1 is charged by a starter generator 63, and the 12 V battery system 2 is charged by the 48 V battery system 1 via a DC/DC converter 3 that is external to (e.g., separate from) the battery systems 1 and 2. The 48 V battery system 1 is connected via a 48 V board net to 48 V-supplied loads, for example, to a 48 V-supplied ECU 5, and the 12 V battery system 2 is connected to 12 V-supplied loads, for example, to 12 V-supplied ECU 6. A voltage variable load, for example, a voltage variable ECU 4 with internal DC/DC converter, may be connected to the 48 V battery system 1 and the 12 V battery system 2. The dual power supply system according to the related art includes a 48 V battery system, a separate 12 V battery system, and a DC/DC converter and, hence, requires a lot of installation space, is heavy, and high in production costs.

Figure 2:
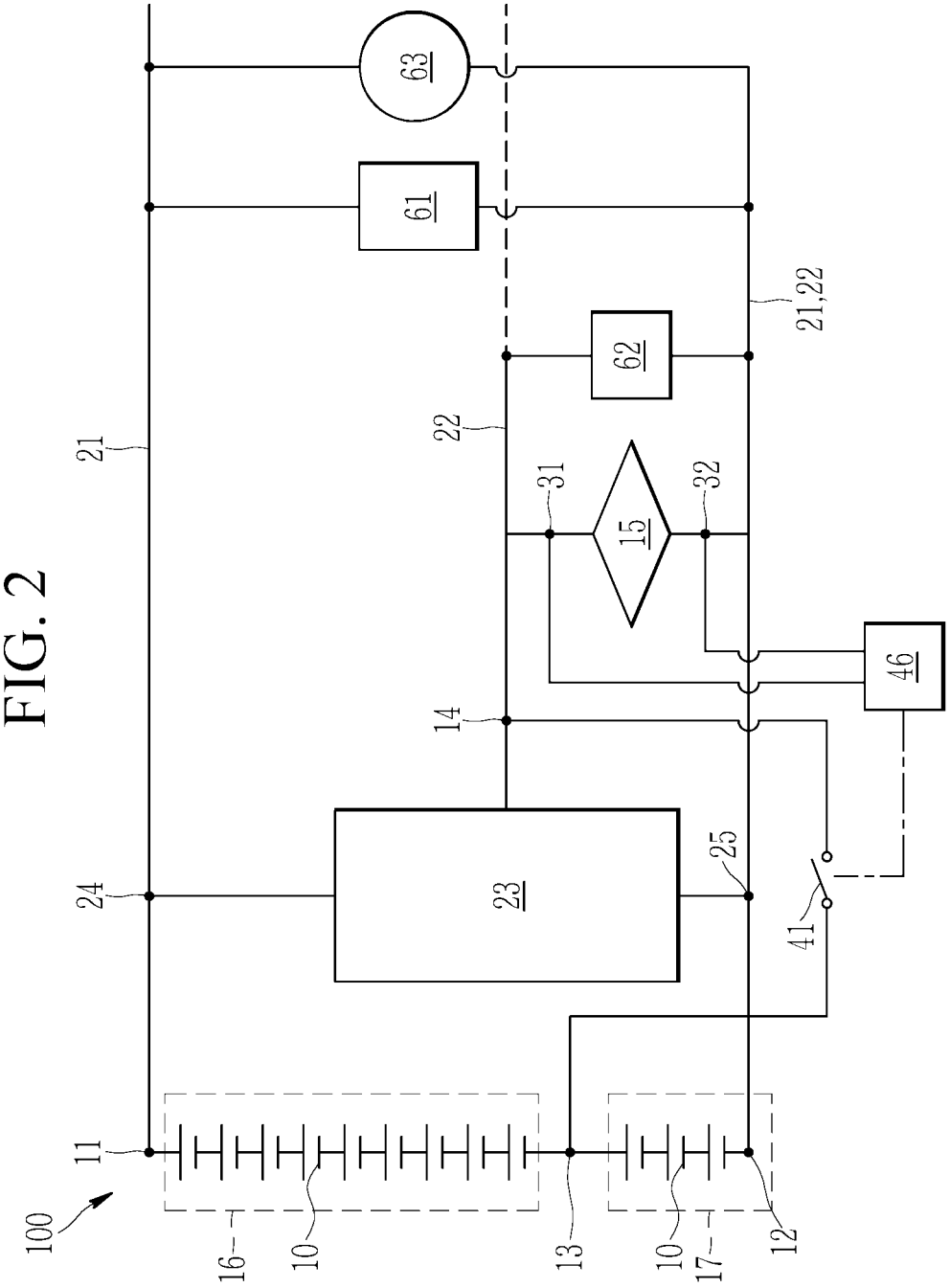
FIG. 2 is a circuit diagram of an electric vehicle including a power supply system according to a first embodiment of the present invention.

FIG. 2 is a circuit diagram of an electric vehicle including a power supply system 100 according to a first embodiment of the present invention.

The power supply system 100 includes a plurality of stacked (e.g., interconnected) battery cells 10 forming a high voltage battery stack that is interconnected between a first stack node 11 and a second stack node 12. The power supply system 100 further includes an intermediate node 13, and the stacked battery cells 10 are divided in a first cell sub-stack 16 between the first stack node 11 and the intermediate node 13 and a second cell sub-stack between the intermediate node 13 and the second stack node 12. Each of the first and second battery sub-stacks 16 and 17 includes a plurality of battery cells 10 connected to each other in series. For example, the first cell sub-stack 16 may include nine battery cells 10, each having a capacity of about 4 V, and the second cell sub-stack 17 may include four battery cells 10, each having a capacity of about 4 V. The stacked battery cells 10 altogether provide a voltage of about 48 V between the first and second stack nodes 11 and 12, and the second sub-stack 17 provides a voltage of about 12 V between the intermediate node 13 and the second stack node 12.

The first stack node 11 provides the added potential of the battery cells 10 connected in series between the first stack node 11 and second stack node 12, while the second terminal 12 provides ground potential. The first stack node 11 is electrically connected to a first electric line shown as upper limitation of the power supply system 100, and the second stack node 12 is electrically connected with a second electric line shown as lower limitation of the power supply system 100. These upper and lower lines form a high-voltage board net 21 that spans between the first and second stack nodes 11 and 12. A starter generator 63 and a first load 61, such as a 48 V high voltage electronic control unit (ECU), are connected to the high-voltage board net 21 (e.g., are interconnected between the first and second stack nodes 11 and 12).

The power supply system 100 further includes a step-down converter (e.g., a DC/DC converter) 23 connected between the first stack node 11 and the second stack node 12 in parallel with the stacked battery cells 10. A first input node 24 of the step-down converter 23 may be connected to the first stack node 11, and a second input node 25 of the step-down converter 23 may be connected to the second stack node 12. The step-down converter 23 thus receives the voltage provided by the stacked battery cells 10, approximately 48 V, as an input voltage. The step-down converter 23 is configured to output a reduced voltage via a low voltage node 14.

The power supply system 100 further includes a low-voltage board net 22 that spans between the second stack node 12 and the low voltage node 14. A low-voltage battery 15 is part of (e.g., is connected to) the low-voltage board net 22 and is interconnected between the second stack node 12 and the low voltage node 14. The low-voltage battery 15 may be a nickel-cadmium battery configured to output a second operation voltage of approximately 12 V for supplying the low-voltage board net 22. Further, a second load 62, such as a 12 V high voltage electronic control unit (ECU), is connected to the low-voltage board net 22 (e.g., is interconnected between the second stack node 12 and the low voltage node 14). The electric lines forming the high-voltage board net 21 and the low-voltage board net 22 are electrical conductors, such as wires, conducting elements on a circuit carrier, such as metallizations or conductive polymers on a printed circuit board (PCB).

The power supply system 100 further includes a control unit 46 that is configured to detect the terminal voltage of the low-voltage battery 15. The control unit 46 is electrically connected to a first voltage measurement node 31 at a first terminal of the low-voltage battery 15 and to a second voltage measurement node 32 at a second terminal of the low-voltage battery 15. The control unit 46 thus receives the voltage of the low-voltage battery 15 as an input. The control unit 46 is further configured to control the conductivity (e.g., the state) of a first switching element 41 that is interconnected between the intermediate node 13 and the low voltage node 14. The control unit 46 is configured to set the conductivity of the first switching element 41 based on the detected terminal voltage of the low-voltage battery 15. For example, when the terminal voltage of the low-voltage battery 15 drops below a first voltage threshold (e.g., a first predetermined voltage threshold), the control unit 46 sets the first switching element 41 conductive (e.g., sets the first switching element 41 into a conductive state).

In the event of a cell failure of the low-voltage battery 15, the low-voltage battery 15 may fail to supply the second load 62, which might be a security relevant load. Although the step-down converter 23 could supply the low-voltage board net 22 in principle, relying solely on the step-down converter 23 to supply the low-voltage board net 22 in the event of low-voltage battery 15 failure would involve implementing strict safety measures on the step-down converter 23. Hence, in the power supply system 100 shown in FIG. 2, the low-voltage board net 22 is supplied by the second sub-stack 22 with a fourth operation voltage of approximately 12 V.

Figure 3:
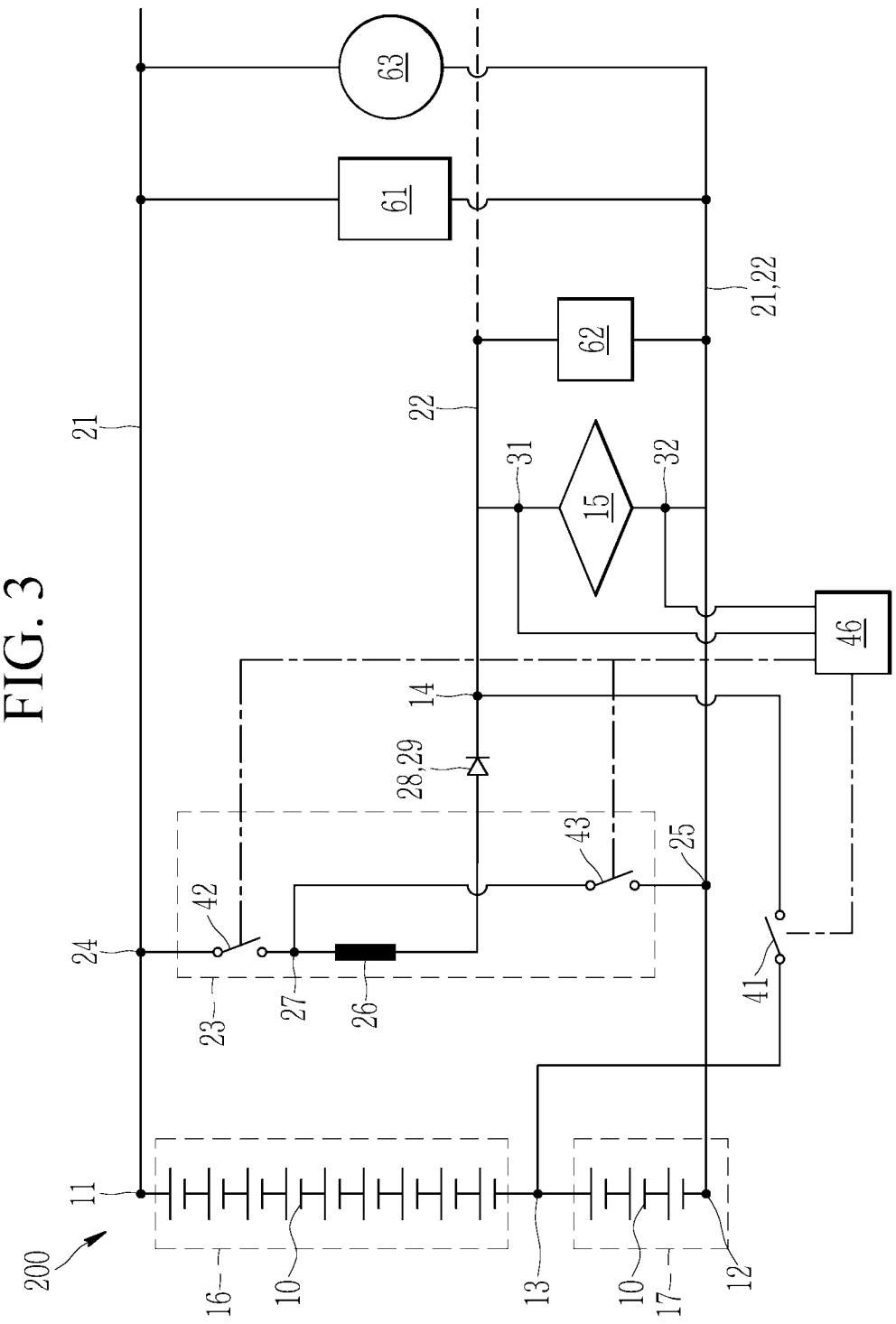
FIG. 3 is a circuit diagram of an electric vehicle including a power supply system according to a second embodiment of the present invention.

FIG. 3 is a circuit diagram of a power supply system 200 according to a second embodiment of the present invention. A description of elements shown in FIG. 3 that are the same as or substantially similar to those described above with respect to FIG. 2 may be omitted.

In FIG. 3, the step-down converter 23 is a buck converter 23 that is connected between the first stack node 11 and the second stack node 12 in parallel with the plurality of battery cells 10. A first input node 24 of the buck converter 23 is electrically connected to the first stack node 11, and a second input node 25 of the buck converter 23 is electrically connected to the second stack node 12. The buck converter 23 includes a second switching element 42 and an energy storage inductor (e.g., a coil or choke) 26 as an energy storage element electrically connected in series between the first input node 24 and an output 31 of the buck converter 23, such as between the second input node 24 and the low voltage node 14. The buck converter 23 further includes a third switching element 43 interconnected between the second input node 25 and a first converter node 27, and the first converter node 27 is interconnected between the second switching element 42 and the energy storage inductor 26. In some embodiments, a rectifying element, such as a diode, may be used instead of the third switching element 43. The first to third switching elements 41, 42, and 43 are controlled by the control unit 46 as indicated by the dashed-dotted lines shown in FIGS. 2 and 3. Further, a rectifying element 28, such as a diode 33, is interconnected between the low voltage node 14 and the energy storage element 26 to suppress current towards the energy storage element 26 while the low-voltage board net 22 is supplied by the second sub-stack 17.

During a first operation mode of the power supply systems 100 and 200 shown in FIGS. 2 and 3, the low-voltage board net 22 is supplied via the low-voltage battery 15 and the step-down converter 23. Therein, the output voltage of the buck converter 23 shown in FIG. 3 is controlled by setting the duty cycles of the second and third switching elements 42 and 43 via the control unit 46. In a second operation mode, the first switching element 41 is set to be conductive by the control unit 46, and the low-voltage board net 22 is supplied by the second sub-stack 17.

Figure 4:
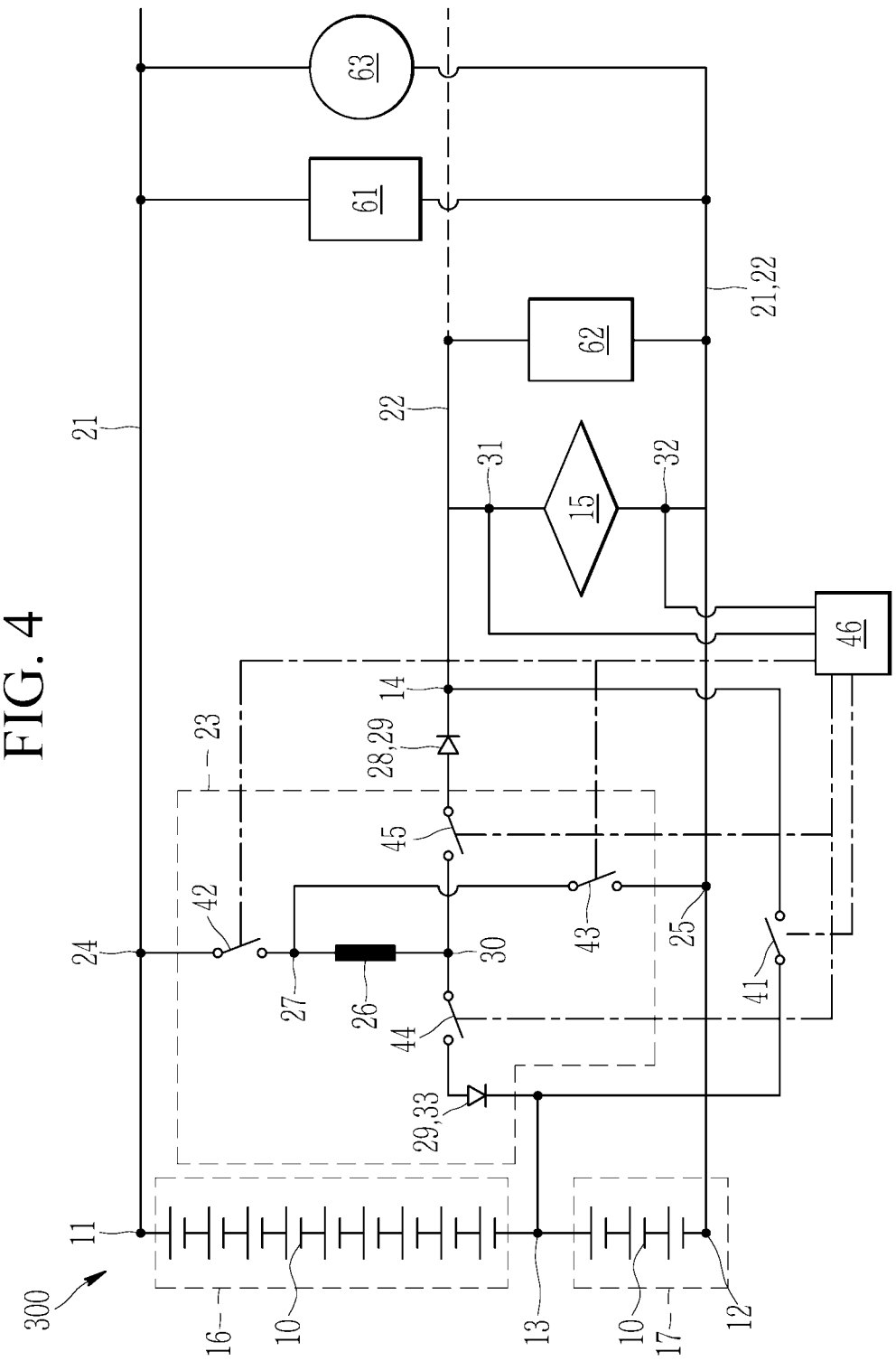
FIG. 4 is a circuit diagram of an electric vehicle including a power supply system according to a third embodiment of the present invention.

FIG. 4 is a circuit diagram of a power supply system 300 according to a third embodiment of the present invention. A description of elements shown in FIG. 4 that are the same as or substantially similar to those described above with respect to FIGS. 2 and/or 3 may be omitted. In FIG. 4, a second converter node 30 of the step-down converter 23 is electrically connected to the intermediate node 13 via a fourth switching element 44 and a second rectifying element 29, such as a diode 33. Further, a fifth switching element 45 is interconnected between the first rectifying diode 28 and the second converter node 30. Therein, the fourth and fifth switching elements 44 and 45 are also controlled by the control unit 46.

The power supply system 300 shown in FIG. 4 allows for a third operation mode in which the step-down converter 23 balances the first and second sub-stacks 16 and 17 and charges the low-voltage battery 15. To balance the battery sub-stacks 16 and 17, the fourth switching element 44 is set to be conductive and the fifth switching element 45 is set to be non-conductive. Then, the output voltage of the converter 23 at the second converter node 30 is set via the duty cycle of the second and third switching elements 42 and 43. To charge the low-voltage battery 15, the fifth switching element 45 is set to be conductive and the fourth switching element 44 is set to be non-conductive. Further, charging and balancing may be performed together by setting the fourth and fifth switching elements 44 and 45 to be conductive. In the third operation mode, first switching element 41 may be non-conductive.

Figure 5:
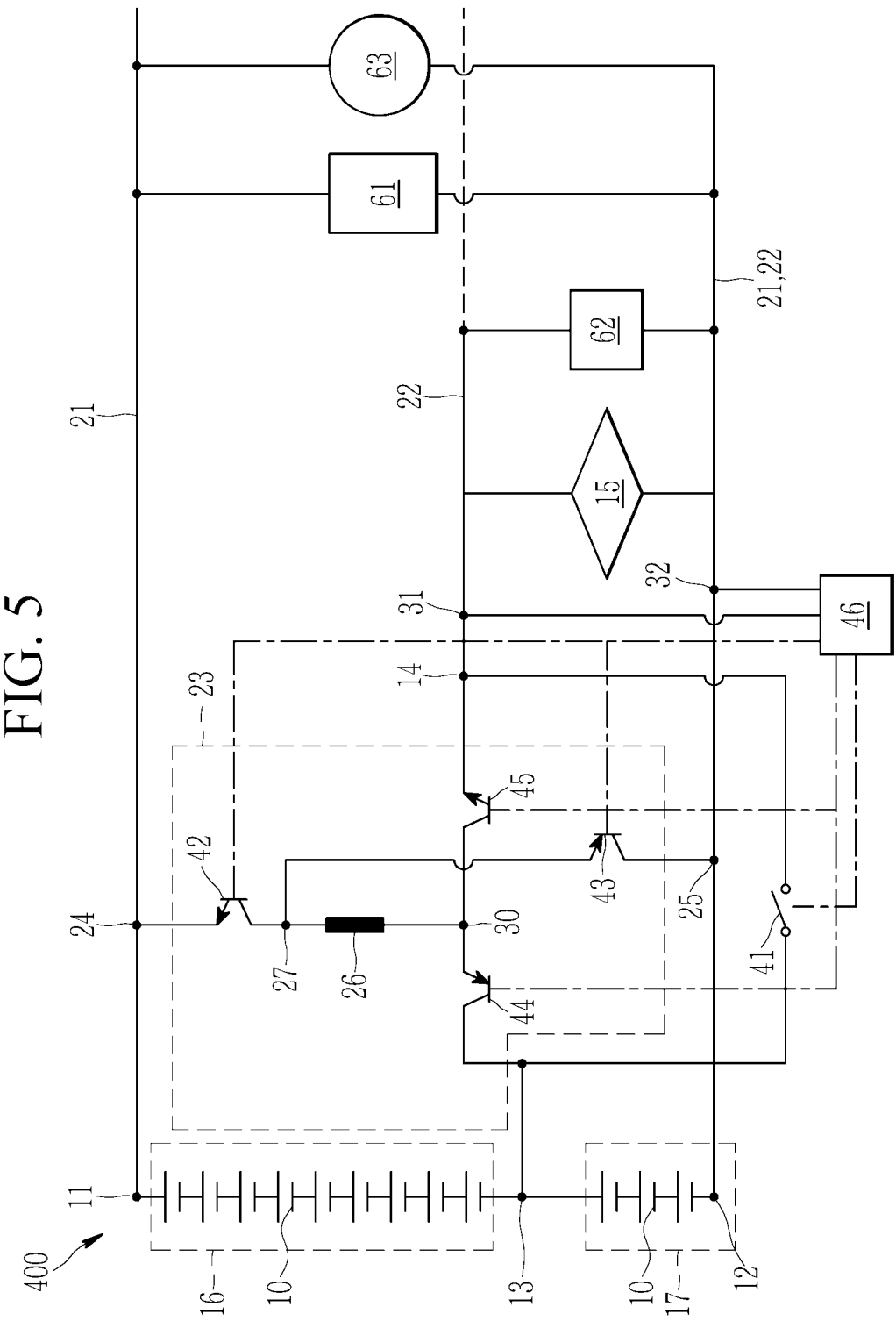
FIG. 5 is a circuit diagram of an electric vehicle including a power supply system according to a fourth embodiment of the present invention.

FIG. 5 is a circuit diagram of a power supply system 400 according to a fourth embodiment of the present invention. A description of elements shown in FIG. 5 that are the same as or substantially similar to those described above with respect to FIGS. 2-4 may be omitted.

In FIG. 5, the second to fifth switching elements 42-45 are transistor switches. For example, the second and third switching elements 42 and 43 are a pair of complementary bipolar transistors (e.g., a NPN bipolar transistor and a PNP bipolar transistor). Further, the fourth and fifth switching elements 44 and 45 are a pair of complementary bipolar transistors (e.g., a PNP bipolar transistor and a NPN bipolar transistor). Hence, the conductivity states of the second to fifth switching elements 42-45 may be controlled with only two control signals output by the control unit 46. Further, according to the embodiment shown in FIG. 5, the first and second voltage measurement nodes 31 and 32 are connected to the low-voltage board net 22 instead of next to the terminals of the low-voltage battery 15.

Figure 6:
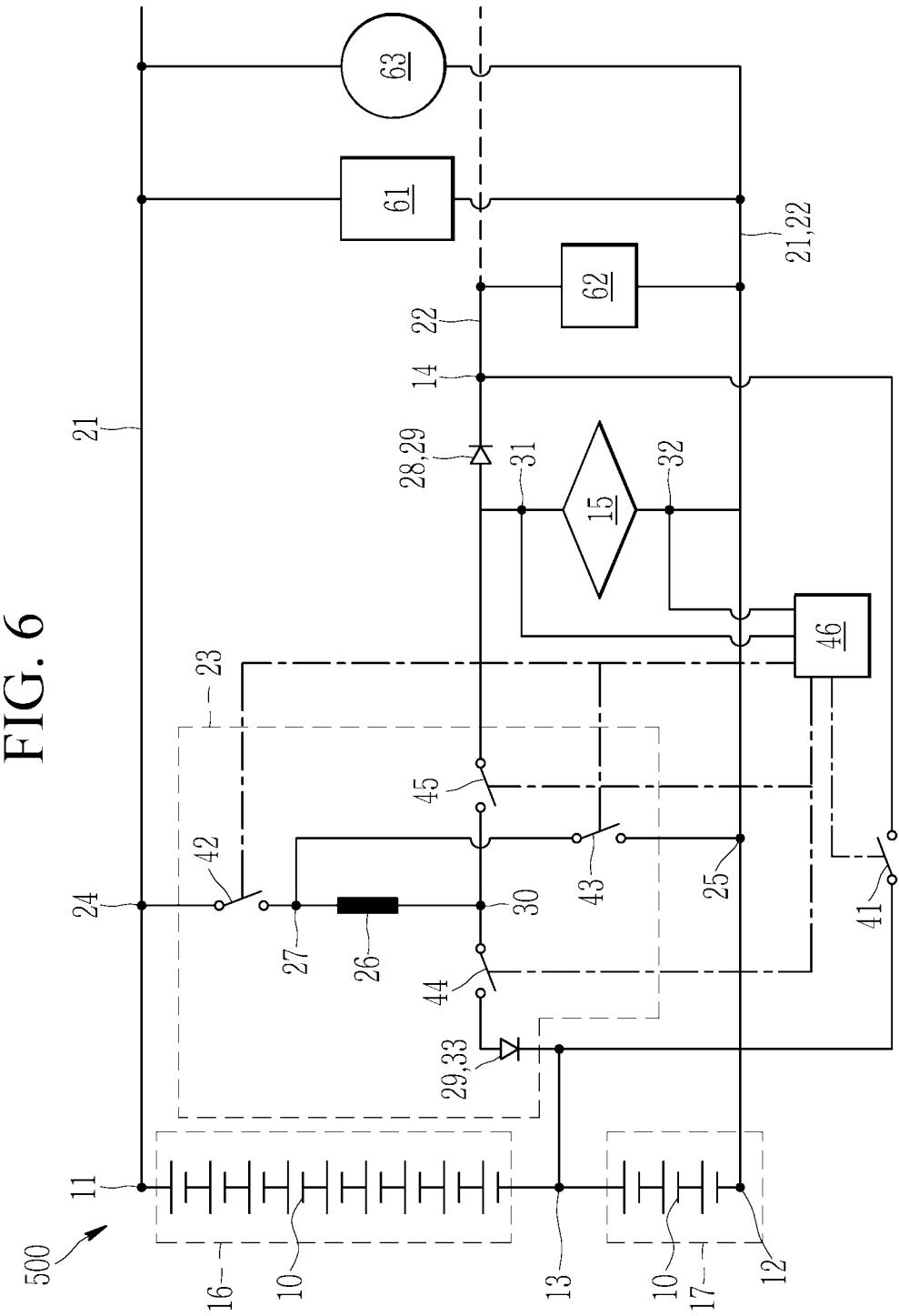
FIG. 6 is a circuit diagram of an electric vehicle including a power supply system according to a fifth embodiment of the present invention.

FIG. 6 is a circuit diagram of a power supply system 500 according to a fifth embodiment of the present invention. A description of elements shown in FIG. 6 that are the same as or substantially similar to those described above with respect to FIGS. 2-5 may be omitted. In FIG. 6, the first rectifying diode 28 is interconnected between the low voltage node 14 and the second converter node 30. Further, the low-voltage battery 15 is interconnected between the first rectifying diode 28 and the second converter node 30. Thus, the power supply system 500 shown in FIG. 6 allows for a fourth operation mode in which charging of the low-voltage battery 15 via the step-down converter 23 may occur while the low-voltage board net 22 is operated by (e.g., is powered by) the second sub-stack 17 via the conductive first switching element 41. Thus, the low-voltage board net 22 is operable via (e.g., is powered by) the second sub-stack 17 when the low-voltage battery 15 is initially discharged, for example, at a cold start, and while the low-voltage battery 15 is charged (e.g., is concurrently charged) for later use.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conductive elements, such as on a PCB or on another kind of circuit carrier. The conductive elements may include metallizations, such as surface metallizations and/or pins, and/or may include conductive polymers or ceramics. Further, electrical energy might be transmitted via wireless connections, for example, by using electromagnetic radiation and/or light.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

Also, a person of skill in the art should recognize that the functionality of various computing devices may be combined or integrated into a single computing device, or the functionality of a particular computing device may be distributed across one or more other computing devices without departing from the scope of the present invention.

REFERENCE SIGNS 1 48 V battery system
2 12 V battery system
3 DC/DC converter
4 voltage-variable ECU
5 48 V ECU
6 12 V ECU
10 battery cell
11 first stack node
12 second stack node
13 intermediate node
14 low voltage node
15 low-voltage battery
16 first subset of stacked battery cells 17 second subset of stacked battery cells
21 high-voltage board net
22 low-voltage board net
23 step-down converter
24 first input node
25 second input node
26 inductor
28 (first) rectifying element
29 second rectifying element
30 second converter node
31 first voltage measurement node
32 second voltage measurement node
33 diode
41 first switching element
42 second switching element
43 third switching element
44 fourth switching element
45 fifth switching element
46 control unit
61 first load
62 second load
63 starter generator

What is claimed is:

1. A power supply system for an electric vehicle, the power supply system comprising:
a plurality of battery cells interconnected between a first stack node and a second stack node and configured to provide a first operation voltage to a high-voltage board net;
a low-voltage battery interconnected between the second stack node and a low voltage node and configured to output a second operation voltage to a low-voltage board net;
a step-down converter interconnected between the first stack node and the second stack node and configured to output a third operation voltage to the low voltage node to charge the low-voltage battery;
an intermediate node dividing the plurality of battery cells into a first subset of the battery cells and a second subset of the battery cells and being connected to the low voltage node via a first switching element; and
a control unit configured to detect a terminal voltage of the low-voltage battery and to set the first switching element into a conductive state according to the detected terminal voltage,
wherein the step-down converter is configured to transfer energy from the first subset of the battery cells to the second subset of the battery cells via a fourth switching element electrically connected between the low voltage node and the intermediate node.

2. The power supply system according to claim 1, wherein the third operation voltage is less than or equal to the second operation voltage.

3. The power supply system according to claim 2, wherein the second subset of the battery cells provides a fourth operation voltage that has a level between the second operation voltage and the third operation voltage.

4. The power supply system according to claim 3, wherein the control unit is configured to set the first switching element into the conductive state when the detected terminal voltage is less than a first voltage threshold.

5. The power supply system according to claim 4, wherein the control unit is configured to set the first switching element into a non-conductive state when the detected terminal voltage is greater than a second voltage threshold.

6. The power supply system according to claim 5, wherein the first voltage threshold is less than at least one of the second to fourth operation voltages.

7. The power supply system according to claim 1, further comprising a second switching element and a third switching element,
wherein the step-down converter comprises a first input node connected to the first stack node and a second input node connected to the second stack node,
wherein the second switching element and an energy storage element are connected between the first input node and the low voltage node, and
wherein the third switching element is interconnected between the second input node and a first converter node, the first converter node being electrically connected between the second switching element and the energy storage element.

8. The power supply system according to claim 7, wherein the energy storage element is an inductor or a capacitor.

9. The power supply system according to claim 7, further comprising a rectifying element interconnected between the low voltage node and the step-down converter and configured to suppress current from the low voltage node to the step-down converter.

10. The power supply system according to claim 9, wherein the rectifying element is a diode.

11. The power supply system according to claim 7, wherein the step-down converter is configured to output the third operation voltage to the intermediate node to transfer energy from the first subset of the battery cells to the second subset of the battery cells.

12. The power supply system according to claim 11, wherein the step-down converter comprises a second converter node, the fourth switching element, and a fifth switching element,
wherein the second converter node is electrically connected between the low voltage node and the energy storage element;
wherein the fourth switching element is electrically connected between the second converter node and the intermediate node; and
wherein the fifth switching element is electrically connected between the second converter node and the low voltage node.

13. The power supply system according to claim 12, wherein the control unit is further configured to control at least one of the second, third, fourth, and fifth switching elements.

14. The power supply system according to claim 13, wherein the second and third switching elements comprise a first pair of complementary transistors, and
wherein the fourth and fifth switching elements comprise a second pair of complementary transistors.

15. A vehicle comprising:
the power supply system according to claim 1;
a first load interconnected between the first stack node and the second stack node; and
a second load interconnected between the second stack node and the low voltage node.

16. The vehicle according to claim 15, wherein the first load has an operation voltage of about 48 V, and the second load has an operation voltage of about 12 V.

17. A vehicle comprising:
the power supply system according to claim 1; and a starter generator interconnected between the first stack node and the second stack node.

\* \* \* \* \*